(12) United States Patent
Ellison et al.

(10) Patent No.: US 6,424,779 B1
(45) Date of Patent: Jul. 23, 2002

(54) FIBER TROUGH COUPLING SYSTEM

(76) Inventors: Steven W. Ellison, 12525 E. Midway, Mead, WA (US) 99021; Terry T. Thom, 10128 E. 20th, Spokane, WA (US) 99206

( * ) Notice: Subject to any disclaimer, the term of this patent is extended or adjusted under 35 U.S.C. 154(b) by 0 days.

(21) Appl. No.: 09/649,822

(22) Filed: Aug. 28, 2000

(51) Int. Cl.7 .................................................. G02B 6/00
(52) U.S. Cl. ....................................... 385/134; 403/341
(58) Field of Search ................................. 385/135, 136; 403/363, 402, 375, 341

(56) References Cited

U.S. PATENT DOCUMENTS

| 5,316,243 | A | | 5/1994 | Henneberger | 248/68.1 |
|---|---|---|---|---|---|
| 5,752,781 | A | | 5/1998 | Haataja et al. | 403/387 |
| 5,917,982 | A | * | 6/1999 | Vargas et al. | 385/134 |
| 5,995,699 | A | * | 11/1999 | Vargas et al. | 385/134 |
| 6,192,181 | B1 | * | 2/2001 | Haataja et al. | 385/136 |

* cited by examiner

Primary Examiner—Tulsidas Patel
(74) Attorney, Agent, or Firm—Wells St. John P.S.

(57) ABSTRACT

Disclosed is a fiber trough coupling system for attaching a first fiber optic cable trough to a second fiber optic cable trough, including an apparatus and a process for the same. More particularly, embodiments of this invention provide such a system which may assembled without the need for installation or assembly tools or additional installation hardware, which will result in a substantial cost savings for the installation.

19 Claims, 9 Drawing Sheets

FIG. II

FIBER TROUGH COUPLING SYSTEM

TECHNICAL FIELD

This invention pertains to a system for the management and routing of fiber optic cables, and more particularly to a coupling for joining various types of troughs which carry fiber optic cables.

BACKGROUND OF THE INVENTION

In the telecommunications industry there are numerous locations where a significant amount of fiber optic cable must be routed within a facility or from one facility to another. The routing within a facility may be from one piece of equipment to another, or from outside lines coming into a central office and to fiber optic connectors where they are connected to equipment within the facility.

The number of fibers may be great and the fibers must all be handled with great care to avoid damage to the fiber cable, which hinders its performance.

In a typical facility, fiber optic troughs are normally used to carry or route the fiber optic cables. Although not necessarily, in most facilities the troughs are located overhead and over the location of the fiber optic distribution frames, bays and equipment.

In certain types of facilities, a significant trough network is needed to contain and route the fiber cables. The installation time and expense can be substantial for said trough systems. The installation time and expense is further increased when the troughs, trough supports and junctions are not readily adaptable to the configuration desired in the facility and when the troughs, couplings, junctions, downfalls and other equipment do not readily or easily assemble, or when tools such as screwdrivers are required for installation. The typical prior art system requires numerous screws to secure the covers and other components together.

The design, layout and assembly of these trough systems are further complicated because of the unique nature of fiber cables and how the fiber cable must be placed, routed and managed. In the management of fiber optic cables, it is important to maintain a minimum bend radius to protect the fiber optic cables. One typical standard minimum bend radius is one and one-half inches, while another standard minimum bend radius is thirty millimeters (30 mm).

It is also desirable to minimize the number and size of bumps, cracks, holes and other deviations from a smooth surface to which the fibers are exposed, or on which the fibers are supported.

For many years there has been an unsatisfied need to reduce the assembly time and/or expense by providing a trough system which minimizes or eliminates the need for the use of screws and other time consuming fasteners and holders, while still providing a trough system which protects the integrity of the fiber cables.

In the typical prior art system numerous screws are utilized to attach the various components to one another. While such screw based systems are easier to design, they burden the facility owner with the unnecessarily high expense of assembly with screws for example, and with attempting to make the system fit the particular facility.

This invention provides a new trough system which reduces the assembly and installation time and expense. In one embodiment, the preferred embodiment, screws are eliminated altogether and components may easily and expeditiously be assembled without the use of tools.

Couplings for use in fiber optic cable trough applications must also be able to withstand heavy weight in applications where a significant amount of fiber optic cable is supported thereby. This combined with the delicate nature of the fiber optic cable make it a relatively unique trough application.

BRIEF DESCRIPTION OF THE DRAWINGS

Preferred embodiments of the invention are described below with reference to the accompanying drawings, which are briefly described below.

FIG. 12 is a is an elevation view of the trough inner wall section of the embodiment of the coupling illustrated in FIG. 3.

DETAILED DESCRIPTION OF THE PREFERRED EMBODIMENTS

Figure 1:
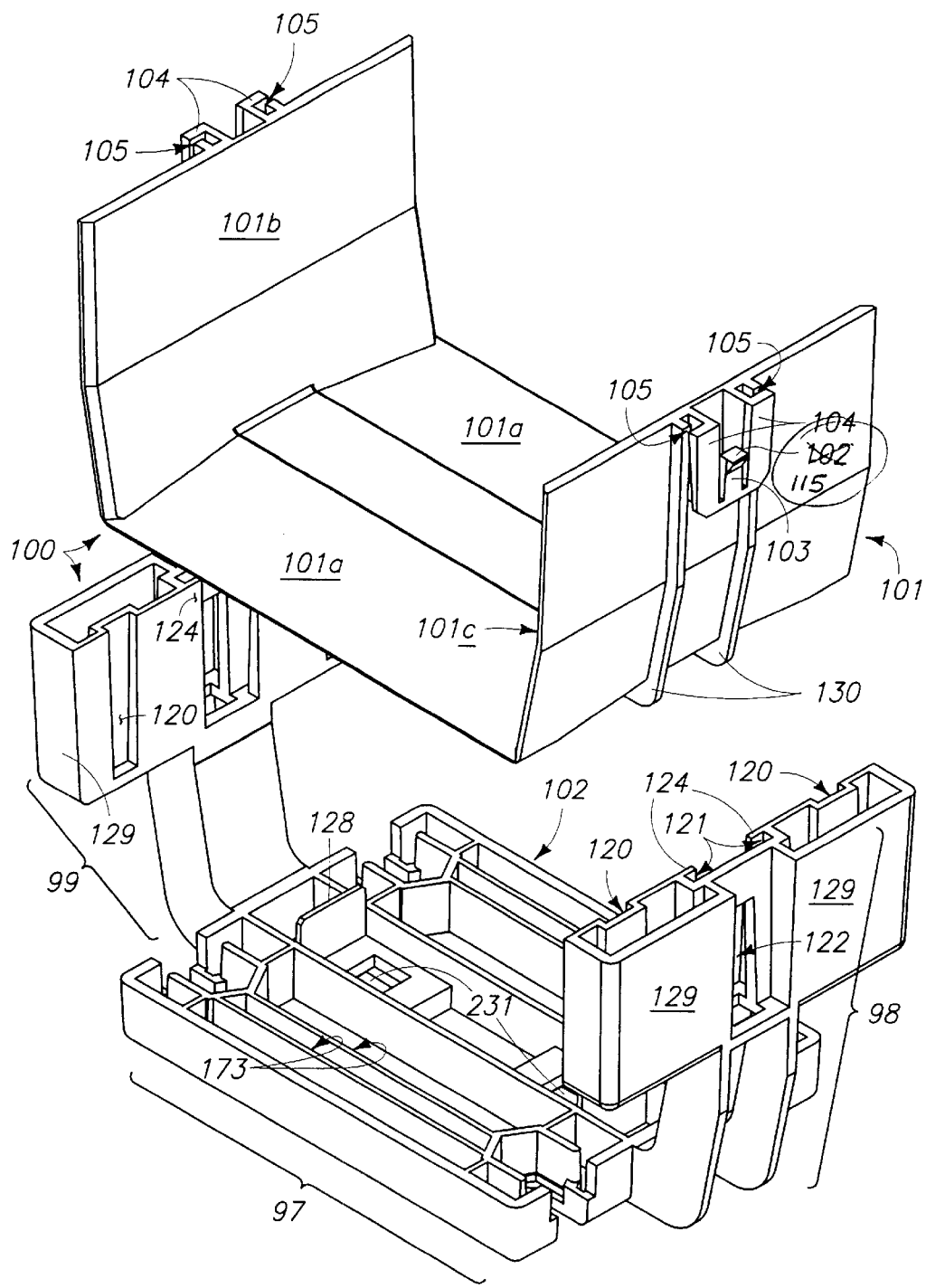
FIG. 1 is an exploded perspective view showing one embodiment of a coupling system contemplated by this invention.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term latch is used herein in a broad sense, and covers numerous different mechanisms of attachment/detachment, including each component of a latch such as corresponding and complementary components which interact with one another. The term latch as used herein is in no way to be limited to the configuration(s) shown in the drawings or described herein. The term latch as used herein, by way of example but not limitation, would therefore include structures which fasten or retain, such as a flexible member with a detent or a tab contained thereon, which would then interact with a corresponding and complementary component (also referred to as a latch), which may be a detent or a tab. Latch is intended to cover each of the configurations or structures that attach or fasten to one another in a complementary way, or would for example allow a component to attach to the side wall of the trough. Further the term latch is intended to cover each of the two complementary components which interact or complement each other.

The term junction trough or junction as used herein means any junction point or area, such as without limitation, horizontal elbows, tees, four way junctions or intersections, and others.

The term transition trough as used herein, means any trough component that facilitates the vertical routing of fiber optic cables, including without limitation, what are referred to as a downspout, downspout converter, down elbow, up elbow and as a trumpet, and others.

The term recipient trough as used herein means any trough component that is to be coupled with the transition trough, such as straight troughs, junction troughs or junctions, and even including other transition troughs. For instance a downspout or down elbow may be a recipient trough at its lower end for a trumpet trough element, as shown in the figures.

The term first trough and second trough as used herein each refer to any type of trough being coupled together.

An embodiment of this invention further includes a second way of attaching or latching the coupling to different types of troughs, if that is desired. For this described embodiment, such as junction troughs, the coupling includes a latch which corresponds to and complements a latch on the trough to which it is to be coupled (in the example given, to a junction trough). In the preferred embodiment of this feature, the latch on the trough to which the coupling is to be attached, is a tab which corresponds to and complements a latch on the coupling. The latch on the coupling is preferably a flexible member with a detent. However, a specific latch structure is not required to practice this invention, nor is a specific latch required on a specific component: for instance in the preferred embodiment described above, the flexible member and detent could be positioned on the trough to which the coupling is to be attached and the tab could be placed on the coupling. Alternatively, the flexible member could include a tab instead of a detent, and the detent corresponding and complementary to the tab could be on the trough to which the coupling is being attached.

In the preferred embodiment straight trough sections will utilize the barb on the trough or on the clip which is on the trough, and the junction trough sections will have latches (tabs or detents) to correspond and complement the coupling latch(es), which will be a flexible member with either a tab or detent thereon.

FIG. 1 is an exploded perspective view showing one embodiment of a coupling system 100 as contemplated by this invention, showing a trough inner wall section 101 and a coupling framework 102.

The trough inner wall section 101 includes bottom wall 101a, first side wall 101b, second side wall 101c, structure rails 130, flexible member 103 with tab 115 forming a latch, guide rails 104 and guide aperture 105.

FIG. 1 shows coupling framework 102 with latch 122 which is a detent which corresponds and is complementary to tab 115 on flexible member 103. FIG. 1 illustrates the first wall structure 99 and second wall structure 98, both of which when attached to or combined with (and spaced apart from) the trough inner wall section 101, define a first wall trough aperture 181 (see FIG. 3) and a second wall trough aperture 184 (see FIG. 3).

Figure 5:
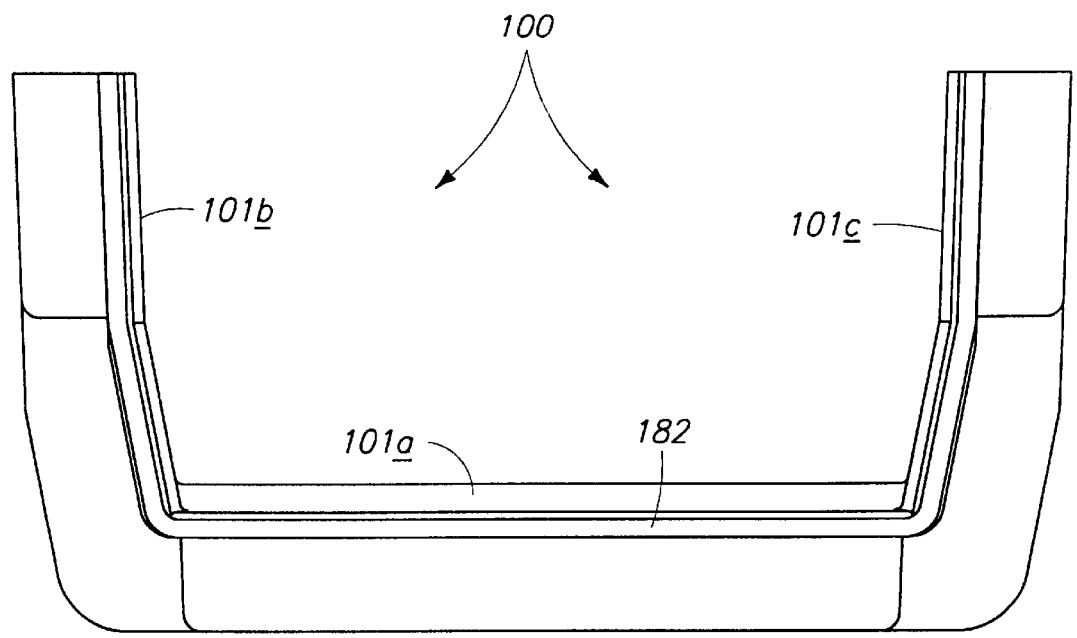
FIG. 5 is an elevation view looking down the interior of the trough, of the embodiment of the coupling illustrated in FIG. 3.
Figure 6:
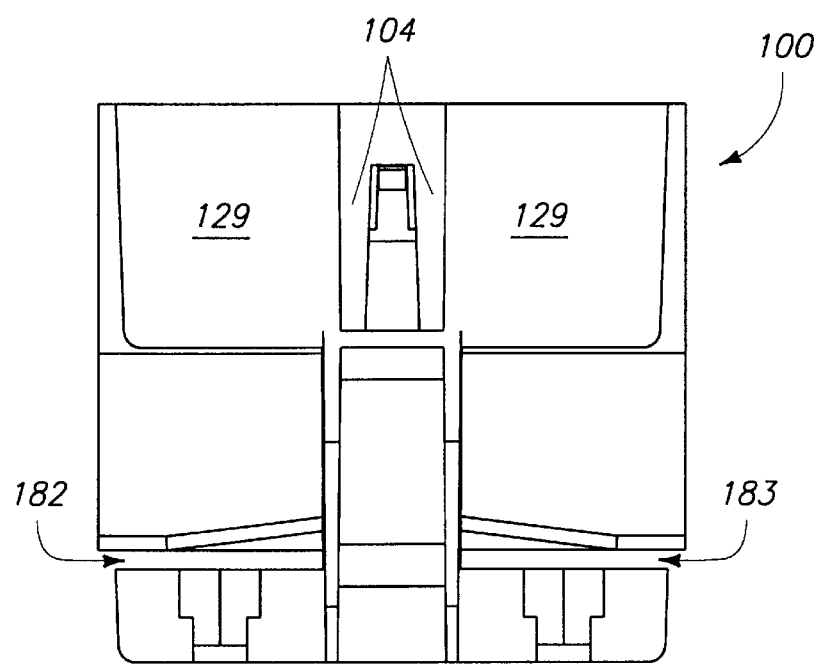
FIG. 6 is a side view of the embodiment of the invention illustrated in FIG. 3.

The coupling framework 102 is also shown with a bottom wall structure 97 which is spaced apart from the bottom wall 101a of the coupling trough section, thereby forming or defining a first bottom wall trough aperture 182 (shown in FIGS. 5 & 6) and a second bottom wall trough aperture 183 (shown in FIG. 6).

The first wall structure 99 of the coupling framework 102 shown, also illustrates a latch 120 (which is a detent latch 120), which corresponds to and is complementary to, a tab form of latch which may be placed on a trough to which the coupling is being attached, preferably a junction trough. The first wall structure 99 itself has some flexibility which allows the first wall structure 99 to flex sufficiently to allow a tab on a trough to pass by structure section 129 to come to rest in detent 120. The second wall structure 98 is the same as the first wall structure 99 in this embodiment with like numbered items which will not be repeated herein.

The second wall structure 98 shown in FIG. 1 further illustrates the guides through which the respective components of the coupling trough section 101 slide to securely attach to the coupling framework 102. Trough retention guides 124 interlock with guide rails 104 to help maintain the form of the trough and prevent the side walls from following their tendency to move toward each other when placed under load.

The coupling framework 102 includes trough supports 128 (only one visible in FIG. 1) which help support and locate the coupling trough section 101 relative to the coupling framework 102. Recess or detent latch 173 is the latch that corresponds to the stop or retention clip on the trough to which the coupling is to be attached, and provides the detent or recess such that the retention clip or stop is not under pressure laterally, but instead is only utilized as a stop (with no pressure exerted on the trough as a result of the stop being between it and the coupling) in the preferred embodiment, as will be described more fully below. In other embodiments, the retention clip could be placed in compression between the two to exert pressure on the trough member being coupled.

Latches 231 are aperture latches which receive a flexible member and tab latch to secure the coupling trough section to the coupling framework, as is described and shown more fully elsewhere.

The bottom wall structure 97 is also shown and individual parts thereof have been described above.

Figure 2:
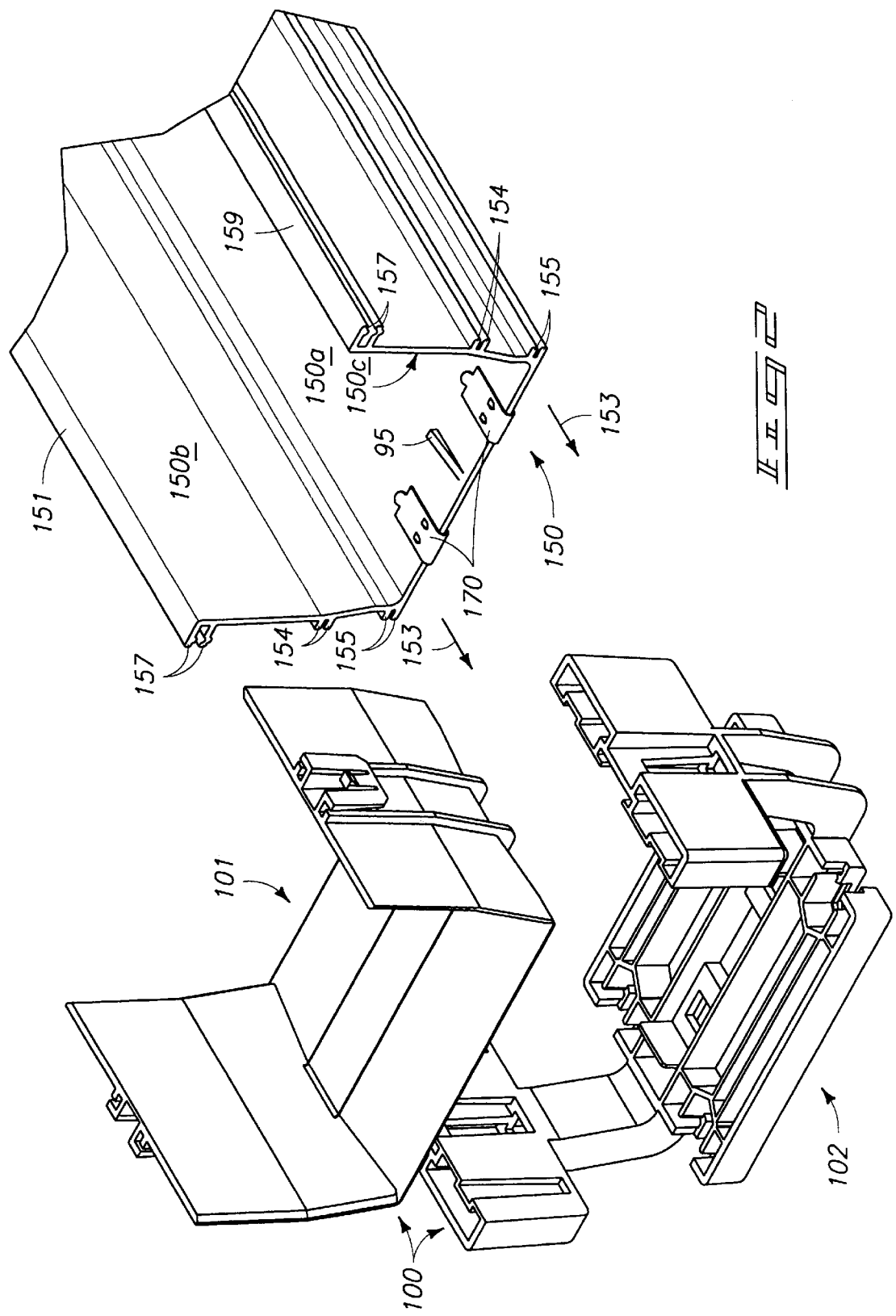
FIG. 2 is an exploded perspective view showing one embodiment of a coupling system contemplated by this invention, along with the end of a fiber trough which may be inserted in one side of the coupling.

FIG. 2 is an exploded perspective view showing one embodiment of a coupling system 100 contemplated by this invention, along with the end of a fiber trough 150 (a straight trough) which may be inserted in a side of the coupling 100. Coupling trough section 101 and coupling framework 102 are shown to illustrate the relation of the coupling 100 relative to a trough 150 which may be attached to it.

Fiber trough 150 has first side wall 150b with the top 151 of first side wall 150b shown, bottom wall 150 (also fiber support surface), second side wall 150c, and top of second side wall 159. If stops are not integral in the trough, stops 170 such as retention clips 170 may be used. The retention clip stops 170 may be placed over and under the terminal end of the trough, and are shown and described more fully below with respect to FIGS. 8, 9 & 10.

The fiber trough 150 is shown with rails 154 and rails 155 on the side walls thereof, and direction arrows 153 show how the trough 150 is moved in a predetermined way to securely attach it to the coupling 100 without any further tools and without the need to install numerous screws to secure the coupling together.

FIG. 2 also illustrates an alternative stop on trough 150, a barb stop or latch 95 which is integral with the trough 150 and which helps hinder or prevent the coupling 100 and the trough 150 from becoming detached once they have been attached or coupled. One or more barb stops or latches 95 may be used as the only structure(s) preventing the trough from being removed from the coupling.

Figure 3:
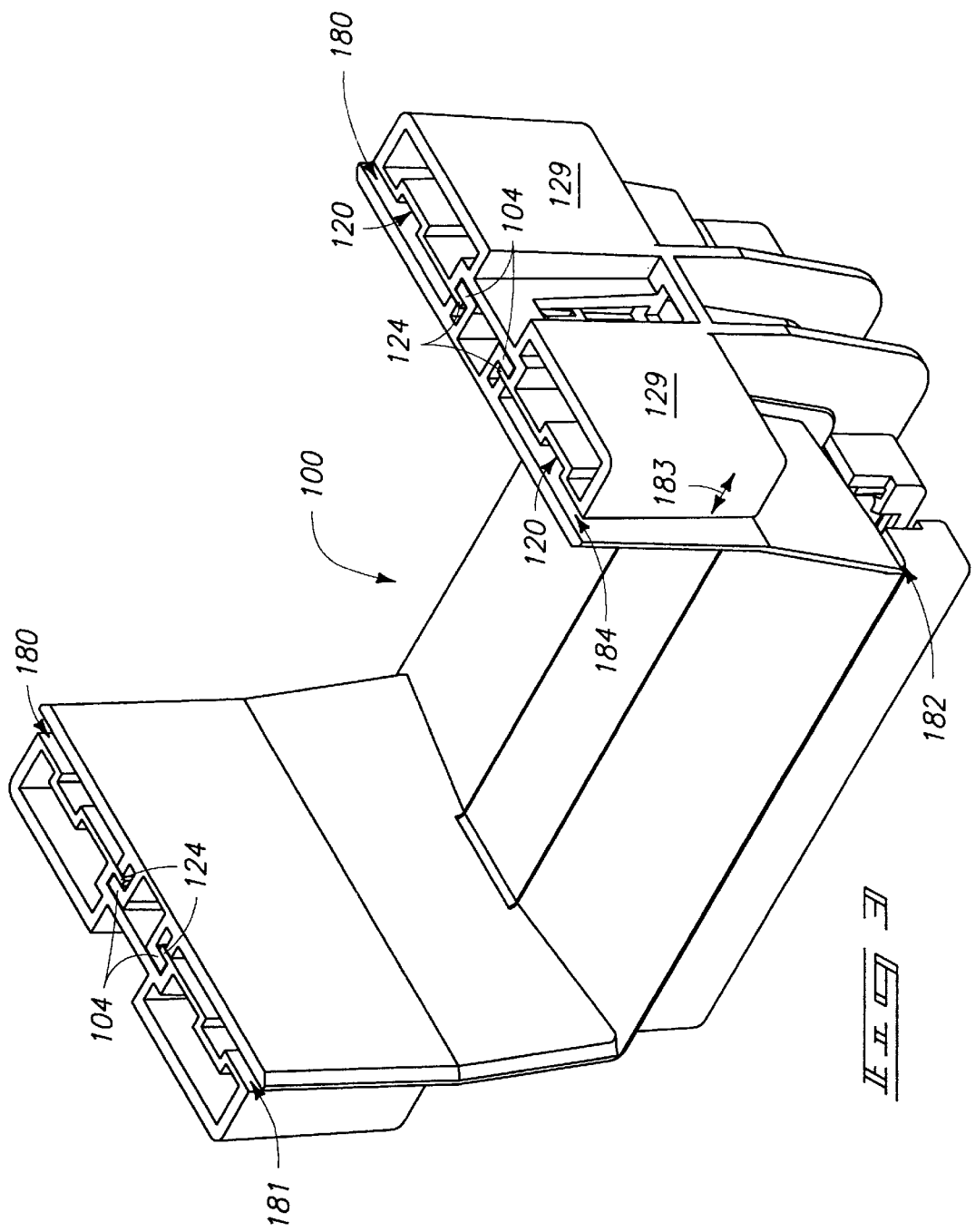
FIG. 3 is a perspective view showing the coupling in its assembled condition after the two components have been latched or snapped together.

FIG. 3 is a perspective view showing the coupling 100 in its assembled condition after the coupling trough section has been attached to the coupling framework, through two or more latches. In some embodiments of this invention the coupling is one piece, in others it is preferably the two pieces shown in the Figures.

FIG. 3 also shows structure section 129 and the direction of movement 183 of structure sections 129 to allow it, combined with recess or detent 120, to act as a latch as described more fully herein. FIG. 3 also shows trough apertures 180, 181, and 184, which are slots or apertures into which troughs may be inserted and secured. Other parts or items are described above and similarly numbered in FIG. 3, and will not therefore recited each be recited or referred to here.

Figure 4:
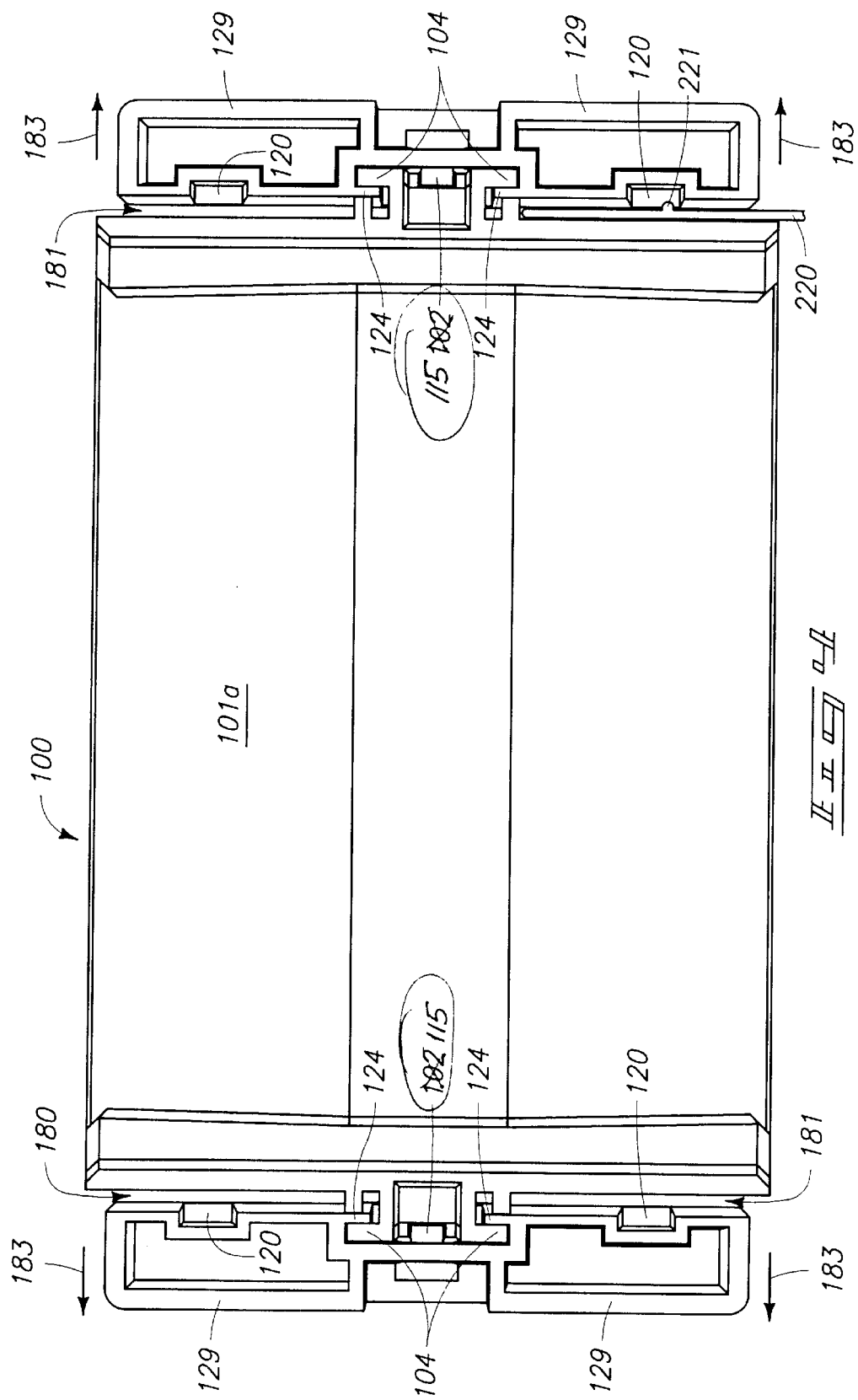
FIG. 4 is a top view of the embodiment of the invention illustrated in FIG. 3.

FIG. 4 is a top view of the embodiment of the invention illustrated in FIG. 3, illustrating the same parts or components, similarly numbered and as described or identified above. Each will therefore not be repeated in describing FIG. 4. FIG. 4 does illustrate a partial section of a side wall of a trough as it may be installed in or attached in, the coupling. Exemplary side wall 220 with tab latch 221 is shown inserted or retained in recess 120 or detent latch 120, thereby providing attachment of the trough to the coupling 100.

FIG. 5 is an elevation view looking down the trough, of the embodiment of the coupling invention also illustrated in FIG. 3. FIG. shows the coupling 100, bottom wall 101a of the coupling trough section, first side wall 101b and second side wall 101c of the coupling trough section. FIG. 5 also shows the first bottom wall trough aperture 182 into which the bottom wall of a trough may be inserted in practicing the embodiment of this invention reflected in FIG. 5.

FIG. 6 is a side view of the embodiment of the invention illustrated in FIG. 3, illustrating structure section 129, guide rail 104, first bottom wall trough aperture 182, and second bottom wall trough aperture 183.

Figure 7:
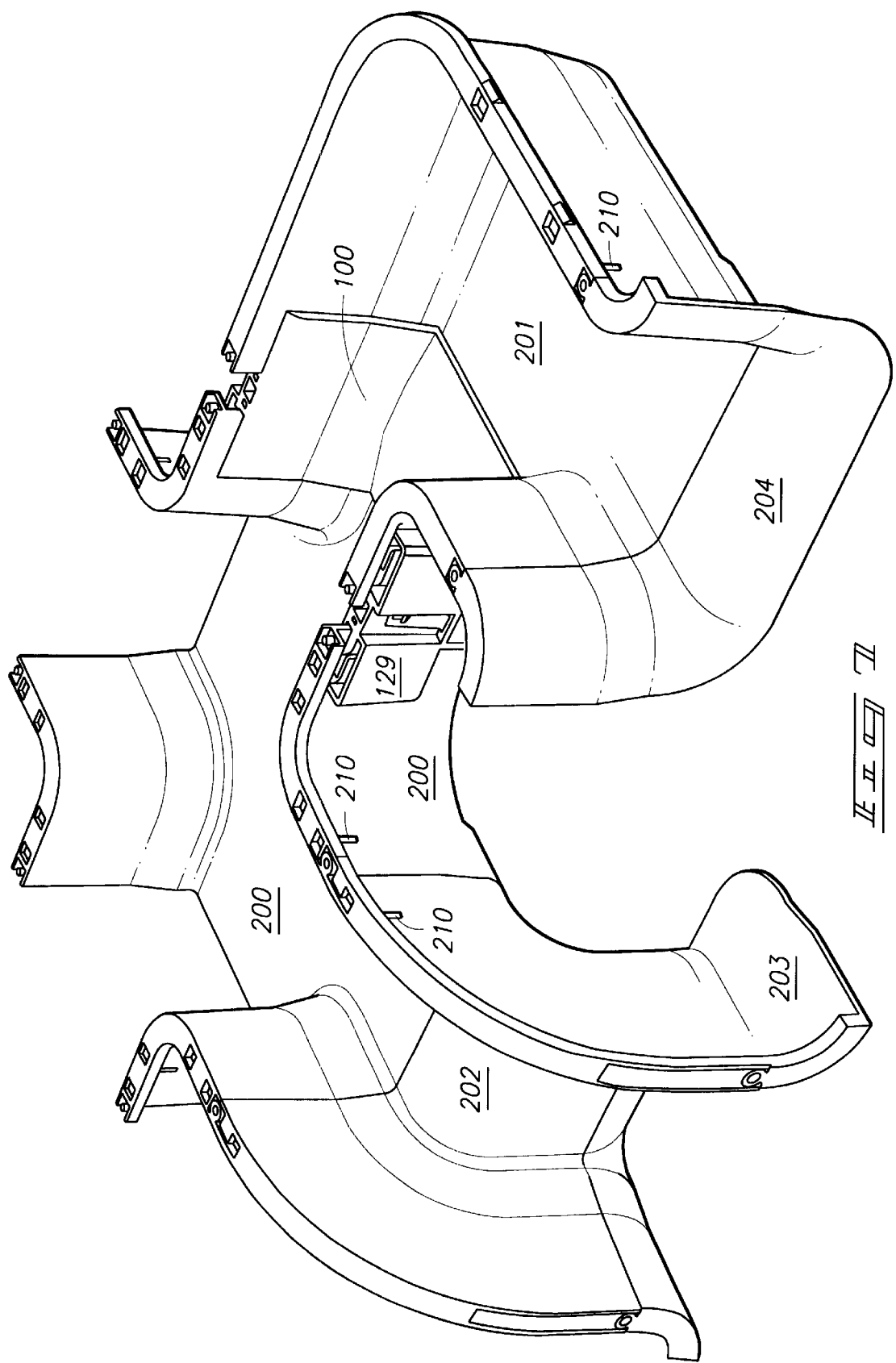
FIG. 7 is a perspective view of one application of the embodiment of the invention illustrated in FIG. 3.

FIG. 7 is a perspective view of one application of the embodiment of the invention illustrated in FIG. 3. FIG. 7 shows elbow junction trough 201 attached by coupling 100 to intersection junction trough 200. This is an application in which a junction trough is attached to a junction trough and the latches described above are utilized in the process. For instance a tab latch like the tab latch shown as item 210 in FIG. 7 interacts with a detent like detent 120 shown in prior figures. The flexible wall allows the tab to become lodged in the detent latch and thereby retained. It should also be noted that an item 210 tab is on transition trough 202, as the coupling system may also be used to couple a transition trough as stated and explained more fully above.

Also illustrated in FIG. 7 are trumpet transition troughs 203 and 204, and downspout transition trough 202.

Figure 8:
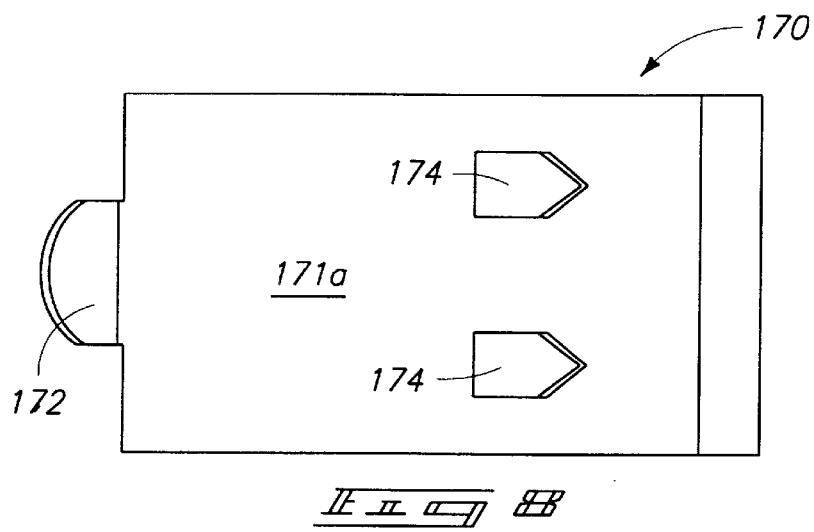
FIG. 8 is a top view of one embodiment of a clip or retention clip which may be placed over an end of a trough or junction to provide additional resistance to the trough or junction coming out of the coupling.

FIG. 8 is a top view of one embodiment of a fiber trough retention clip which may be placed over an end of a trough or junction to provide additional resistance to the trough or junction coming out of the coupling. The embodiment of the fiber trough retention clip 170 illustrated in FIG. 8 shows second body segment 171a, barb stops 174 disposed inwardly to hold the stop on the terminal end of a trough to which it is placed, and tab 172 or latch 172, which corresponds and is complementary to a detent, groove or aperture on the coupling to prevent the trough to which the clip is attached from detaching from the coupling.

Figure 9:
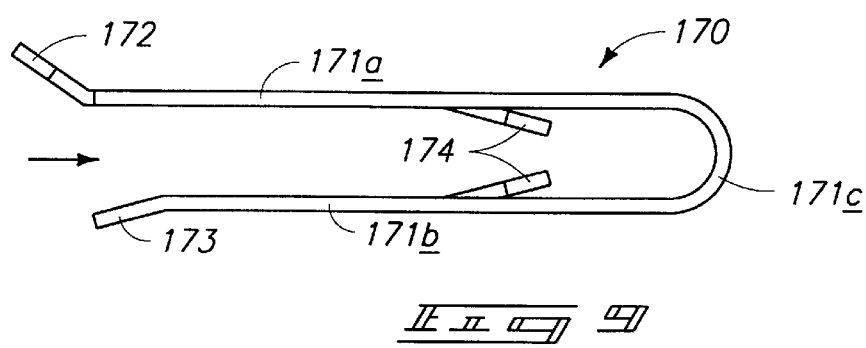
FIG. 9 is a side view of the clip illustrated in FIG. 8.

FIG. 9 is a side view of the retention clip illustrated in FIG. 8, and illustrates first body segment 171a, terminal end segment 171c, second body segment 171b, tab 172 or latch 172, and tab 173. Barb stops 174 are also shown as they would be engaged with the terminal end of a trough.

Figure 10:
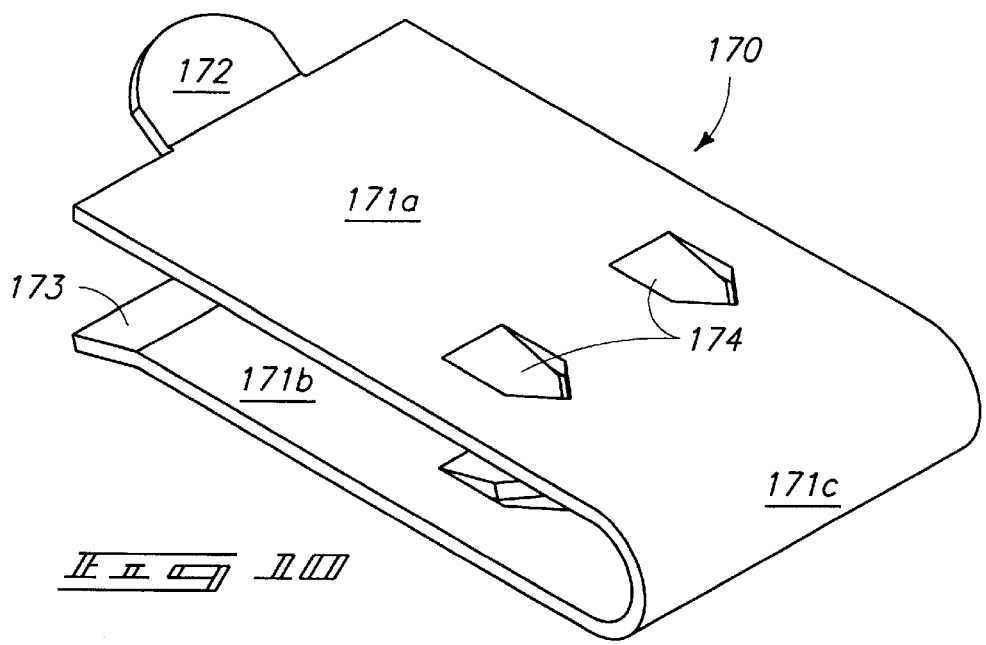
FIG. 10 is a perspective view of the clip illustrated in FIG. 8.

FIG. 10 is a perspective view of the retention clip latch illustrated in FIG. 8, also showing first body segment 171a, terminal end segment 171c, second body segment 171b, tab 172, and tab 173. Barb stops 174 are also shown as they would be engaged with the terminal end of a trough.

Figure 11:
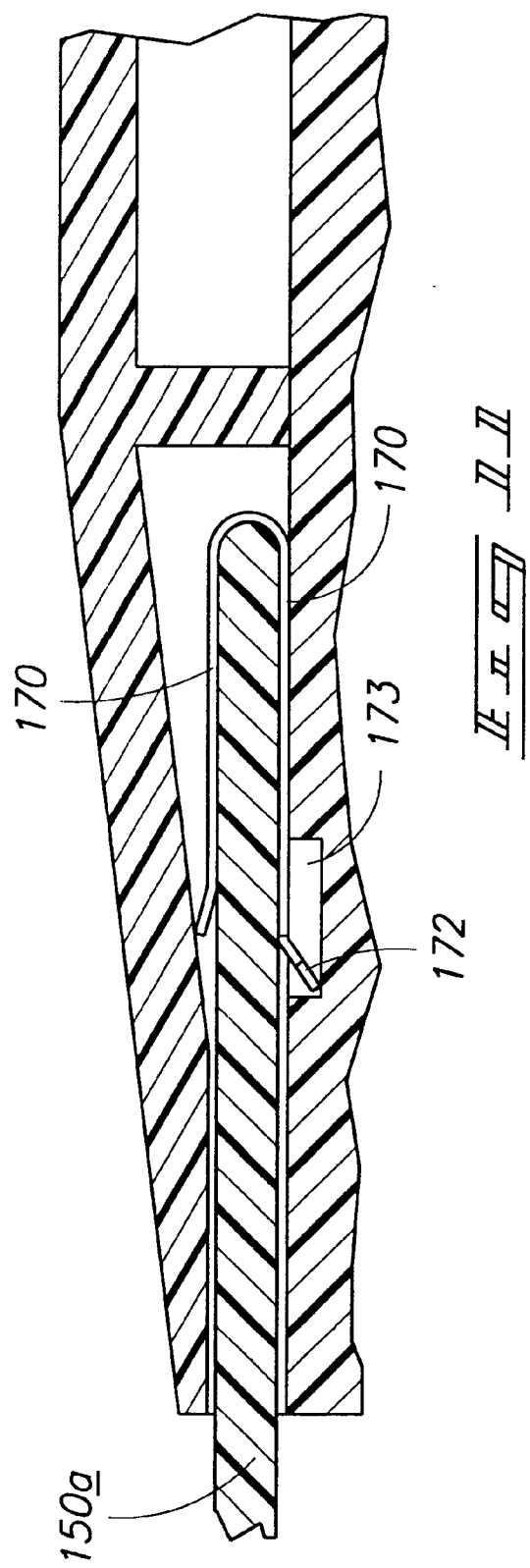
FIG. 11 is a side cross-sectional view of a trough with a clip thereon inserted into the embodiment of the coupling illustrated in FIG. 8.
Figure 11:
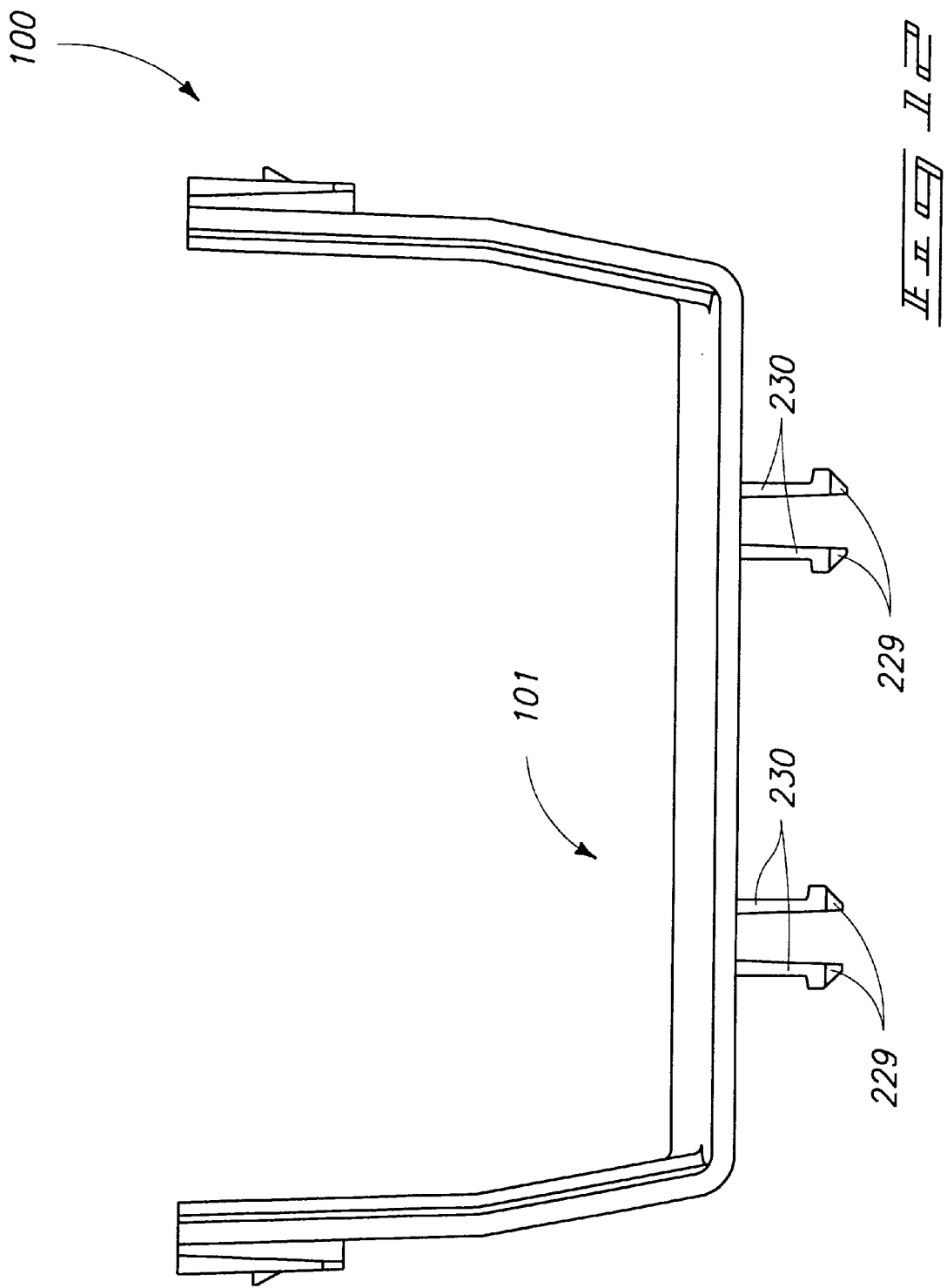

FIG. 11 is a side cross-sectional view of a trough 150a with a retention clip 170 thereon, with the trough 150a and retention clip 170 inserted into the embodiment of the coupling illustrated in FIG. 8. The retention clip tab 172 is illustrated in detent 173, which is a form of a latch and may also be referred to as an aperture, groove or latch.

FIG. 12 is a is an elevation view of the trough inner wall section of the embodiment of the coupling illustrated in FIG. 3, illustrating coupling 100, trough inner wall section 101. The trough inner wall section 101 is shown with two latches of the flexible member 230 with tab 229 type, which correspond to and interact with two apertures 231 (see FIG. 1) in the coupling framework 102. The two latches help hold the two components 101 & 102, of the coupling 100 together (as shown in FIG. 2).

The tab latches in the trough as well as the barb stops in the trough may be created by molding them into the trough or through the use of a tool, with no one in particular being required to practice this invention.

As will be appreciated by those of reasonable skill in the art, there are numerous embodiments to this invention, and variations of elements and components which may be used, all within the scope of this invention.

One embodiment of this invention for example is a fiber optic trough coupling for coupling a first trough with a trough stop thereon, to a second trough with a trough stop thereon, the coupling is comprised of: a trough inner wall section with a first end and a second end, the inner wall section forming the inner walls of a trough; a coupling framework attached to the trough inner wall section, and disposed around it to form a first trough aperture at the first end of the coupling and a second trough aperture at the second end of the coupling, the first trough aperture being disposed to receive and complement the first trough stop to secure the first trough in the first trough aperture; the second trough aperture being disposed to receive and complement the second trough stop to secure the second trough in the first trough aperture.

In other embodiments of the invention, the first trough stop may be an integral barb on the first trough, or the first trough stop may be a retention clip disposed around an end of the first trough, the clip including a barb.

In another embodiment of the invention, the first trough stop is a retention clip disposed around an end of the first trough, and the retention clip is comprised of a retention clip body with a first body segment, a second body segment, a terminal end segment attaching the first body segment and the second body segment, the retention clip being conformed or conformable to and around the terminal end of the fiber trough, the first body segment including a latch corresponding and complementary to the trough aperture latch, and the retention clip further including a terminal end stop disposed to engage the terminal end of the trough it conforms to, thereby securing the retention clip on the terminal end of the trough.

Additional embodiments of the above may include a coupling in which the coupling further includes a coupling latch, the coupling latch being adapted to interact with a corresponding and complementary latch on the first trough.

In a more detailed embodiment, a fiber optic trough coupling for coupling a first trough with a trough stop thereon, to a second trough with a trough stop thereon is disclosed, with the coupling being comprised of: a coupling trough section with a first end and a second end, the coupling trough section including a bottom wall, a first side wall and a second side wall, the coupling trough section corresponding to the first trough and second trough to be joined; a coupling framework disposed around the coupling trough section, the coupling framework having a first end and a second end, and being comprised of: a first wall structure spaced apart from the first side wall of the coupling trough section to define a first wall trough aperture at both the first end and the second end of the coupling framework; a second wall structure spaced apart from the second side wall of the coupling trough section to define a second wall trough aperture at both the first end and the second end of the coupling framework; a bottom wall structure spaced apart from the bottom wall of the coupling trough section to define a bottom wall trough aperture at both the first end and the second end of the coupling framework; wherein the coupling is disposed to operatively couple the first trough and the second trough to one another solely by movement of the first trough into the first trough aperture and by movement of the second trough into the second trough aperture, such that the first trough stop and the second trough stop are disposed to engage the coupling to prevent the first trough from exiting the first trough aperture and to prevent the second trough from exiting the second trough aperture.

As with earlier stated embodiments, the foregoing may include different types of stops, retention clips, as well as also having a coupling latch as part of the coupling, the coupling latch being adapted to interact with a corresponding and complementary latch on the first trough.

There are also process embodiments contemplated by this invention, such as a process for coupling a first fiber optic cable trough to a second fiber optic cable trough, the process comprising the following steps: providing a coupling comprised of: a trough inner wall section with a first end and a second end, the inner wall section forming the inner walls of a trough; and a coupling framework attached to the trough inner wall section, and disposed around it to form a first trough aperture at the first end of the coupling and a second trough aperture at the second end of the coupling; providing a first fiber optic cable trough with a stop thereon; providing a second fiber optic cable trough with a stop thereon; moving the first fiber optic cable trough into the first trough aperture, thereby engaging the first trough stop with the coupling and securing the second trough in the coupling; and moving the second fiber optic cable trough into the second trough aperture, thereby engaging the second trough stop with the coupling and securing the second trough in the coupling.

Another process embodiment contemplated by the invention involves the process for coupling a first fiber optic cable trough to a second fiber optic cable trough utilizing a latch, the process comprising the following steps: providing a coupling comprised of: a trough inner wall section with a first end and a second end, the inner wall section forming the inner walls of a trough; and a coupling framework attached to the trough inner wall section, and disposed around it to form a first trough aperture at the first end of the coupling and a second trough aperture at the second end of the coupling; a coupling latch at the second end of the coupling; providing a first fiber optic cable trough with a stop thereon; providing a second fiber optic cable trough with a latch which corresponds to and complements the coupling latch; moving the first fiber optic cable trough into the first trough aperture, thereby engaging the first trough stop with the coupling and securing the second trough in the coupling; and moving the second fiber optic cable trough into the second trough aperture, thereby engaging the coupling latch with the latch on the second trough and thereby securing the second trough in the coupling.

Yet another process embodiment contemplated by this invention contemplates a process for coupling a first fiber optic cable trough to a second fiber optic cable trough utilizing a separate retention clip, the process comprising the following steps: providing a coupling comprised of: a trough inner wall section with a first end and a second end, the inner wall section forming the inner walls of a trough; and a coupling framework attached to the trough inner wall section, and disposed around it to form a first trough aperture at the first end of the coupling and a second trough aperture at the second end of the coupling; a coupling latch at the second end of the coupling; providing a first fiber optic cable trough; placing a retention clip over an end of the first fiber optic cable trough, the retention clip including a stop thereon; providing a second fiber optic cable trough with a latch thereon; moving the first fiber optic cable trough into the first trough aperture, thereby engaging the first trough stop with the coupling and securing the second trough in the coupling; and moving the second fiber optic cable trough into the second trough aperture, thereby engaging the coupling latch with the second trough latch, and thereby securing the second trough in the coupling.

Further embodiments from the aforenamed process include providing a retention clip which is comprised of a retention clip body with a first body segment, a second body segment, a terminal end segment attaching the first body segment and the second body segment, the retention clip being conformed or conformable to and around the terminal end of the fiber trough, the first body segment including a latch corresponding and complementary to the trough aperture latch, and the retention clip further including a terminal end stop disposed to engage the terminal end of the trough it conforms to, thereby securing the retention clip on the terminal end of the trough.

Embodiments of the invention as stated above include a retention clip as part of the combination. However, the retention clip as described above is also a separate embodiment of this invention separate from it being combined as recited above. The retention clip may also combine with a trough aperture latch which is a detent and the retention clip latch is a corresponding and complementary tab on the first body segment of the retention clip.

In yet another embodiment of the invention, a fiber optic trough coupling for coupling a first trough to a second trough is provided, and the coupling is comprised of: a trough inner wall section with a first end and a second end, the inner wall section forming the inner walls of a trough, the trough inner wall section including at least two inner wall section latches; a coupling framework attached to the trough inner wall section, and disposed around it to form a first trough aperture at the first end of the coupling and a second trough aperture at the second end of the coupling, the coupling framework including at least two framework latches corresponding and complementary to the at least two inner wall section latches; the first trough aperture being disposed to receive and complement the first trough stop to secure the first trough in the first trough aperture; the second trough aperture being disposed to receive and complement the second trough stop to secure the second trough in the first trough aperture; and wherein the trough inner wall section attaches to the coupling framework through the attachment of the at least two inner wall section latches to the at least two framework latches by moving the trough inner wall section together with the coupling framework.

The foregoing embodiment may, but need not, be further specified such that the at least two inner wall section latches are adapted to detach from the at least two coupling framework latches.

Yet another further embodiment is wherein the trough inner wall section attaches to the coupling framework solely through the attachment of the at least two inner wall section latches to the at least two framework latches by moving the trough inner wall section together with the coupling framework. The at least two inner wall section latches may also be adapted to detach from the at least two coupling framework latches.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A fiber optic trough coupling which couples two fiber optic trough sections together, comprising:
   (a) a first trough with a trough stop thereon and a second trough with a trough stop thereon;
   (b) a coupling comprising:
      (i) a trough inner wall section with a first end and a second end, the inner wall section forming the inner walls of a trough; and
      (ii) a coupling framework attached to the trough inner wall section, and disposed around it to form a first trough aperture at the first end of the coupling and a second trough aperture at the second end of the coupling,
   the first trough aperture being disposed to receive and complement the first trough stop to secure the first trough in the first trough aperture;
   the second trough aperture being disposed to receive and complement the second trough stop to secure the second trough in the first trough aperture.

2. A fiber optic trough coupling as recited in claim 1, wherein the first trough stop is an integral barb on the first trough.

3. A fiber optic trough coupling as recited in claim 1, wherein the first trough stop is a retention clip disposed around an end of the first trough, the clip including a barb.

4. A fiber optic trough coupling as recited in claim 1, wherein the first trough stop is a retention clip disposed around an end of the first trough, and the retention clip is comprised of a retention clip body with a first body segment, a second body segment, a terminal end segment attaching the first body segment and the second body segment, the retention clip being conformed or conformable to and around the terminal end of the fiber trough, the first body segment including a latch corresponding and complementary to the trough aperture latch, and the retention clip further including a terminal end stop disposed to engage the terminal end of the trough it conforms to, thereby securing the retention clip on the terminal end of the trough.

5. A fiber optic trough coupling as recited in claim 1, and wherein the coupling is further comprised of a coupling latch, the coupling latch being adapted to interact with a corresponding and complementary latch on the first trough.

6. A fiber optic trough coupling which couples two fiber optic trough sections together, comprising:
   (a) a first trough with a trough stop thereon and a second trough with a trough stop thereon;
   (b) a coupling comprising:
      (i) a coupling trough section with a first end and a second end, the coupling trough section including a bottom wall, a first side wall and a second side wall, the coupling trough section corresponding to the first trough and second trough to be joined;
      (ii) a coupling framework disposed around the coupling trough section, the coupling framework having a first end and a second end, and being comprised of:
         (1) a first wall structure spaced apart from the first side wall of the coupling trough section to define a first wall trough aperture at both the first end and the second end of the coupling framework;
         (2) a second wall structure spaced apart from the second side wall of the coupling trough section to define a second wall trough aperture at both the first end and the second end of the coupling framework;
         (3) a bottom wall structure spaced apart from the bottom wall of the coupling trough section to define a bottom wall trough aperture at both the first end and the second end of the coupling framework;
   wherein the coupling is disposed to operatively couple the first trough and the second trough to one another solely by movement of the first trough into the first trough aperture and by movement of the second trough into the second trough aperture, such that the first trough stop and the second trough stop are disposed to engage the coupling to prevent the first trough from exiting the first trough aperture and to prevent the second trough from exiting the second trough aperture.

7. A fiber optic trough coupling as recited in claim 6, wherein the first trough stop is an integral barb on the first trough.

8. A fiber optic trough coupling as recited in claim 6, wherein the first trough stop is a retention clip disposed around an end of the first trough, the retention clip including a barb.

9. A fiber optic trough coupling as recited in claim 6, wherein the first trough stop is a retention clip disposed around an end of the first trough, and the retention clip is comprised of a retention clip body with a first body segment, a second body segment, a terminal end segment attaching the first body segment and the second body segment, the retention clip being conformed or conformable to and around the terminal end of the fiber trough, the first body segment including a latch corresponding and complementary to the trough aperture latch, and the retention clip further including a terminal end stop disposed to engage the terminal end of the trough it conforms to, thereby securing the retention clip on the terminal end of the trough.

10. A fiber optic trough coupling as recited in claim 6, and wherein the coupling is further comprised of a coupling latch, the coupling latch being adapted to interact with a corresponding and complementary latch on the first trough.

11. A process for the coupling a first fiber optic cable trough to a second fiber optic cable trough, the process comprising the following steps:
  (a) providing a coupling comprised of:
    (i) a trough inner wall section with a first end and a second end, the inner wall section forming the inner walls of a trough; and
    (ii) a coupling framework attached to the trough inner wall section, and disposed around it to form a first trough aperture at the first end of the coupling and a second trough aperture at the second end of the coupling;
  (b) providing a first fiber optic cable trough with a stop thereon;
  (c) providing a second fiber optic cable trough with a stop thereon;
  (d) moving the first fiber optic cable trough into the first trough aperture, thereby engaging the first trough stop with the coupling and securing the second trough in the coupling; and
  (e) moving the second fiber optic cable trough into the second trough aperture, thereby engaging the second trough stop with the coupling and securing the second trough in the coupling.

12. A process for the coupling a first fiber optic cable trough to a second fiber optic cable trough, the process comprising the following steps:
  (a) providing a coupling comprised of:
    (i) a trough inner wall section with a first end and a second end, the inner wall section forming the inner walls of a trough; and
    (ii) a coupling framework attached to the trough inner wall section, and disposed around it to form a first trough aperture at the first end of the coupling and a second trough aperture at the second end of the coupling;
    (iii) a coupling latch at the second end of the coupling;
  (b) providing a first fiber optic cable trough with a stop thereon;
  (c) providing a second fiber optic cable trough with a latch which corresponds to and complements the coupling latch;
  (d) moving the first fiber optic cable trough into the first trough aperture, thereby engaging the first trough stop with the coupling and securing the second trough in the coupling; and
  (e) moving the second fiber optic cable trough into the second trough aperture, thereby engaging the coupling latch with the latch on the second trough and thereby securing the second trough in the coupling.

13. A process for the coupling a first fiber optic cable trough to a second fiber optic cable trough, the process comprising the following steps:
  (a) providing a coupling comprised of:
    (i) a trough inner wall section with a first end and a second end, the inner wall section forming the inner walls of a trough; and
    (ii) a coupling framework attached to the trough inner wall section, and disposed around it to form a first trough aperture at the first end of the coupling and a second trough aperture at the second end of the coupling;
    (iii) a coupling latch at the second end of the coupling;
  (b) providing a first fiber optic cable trough;
  (c) placing a retention clip over an end of the first fiber optic cable trough, the retention clip including a stop thereon;
  (d) providing a second fiber optic cable trough with a latch thereon;
  (e) moving the first fiber optic cable trough into the first trough aperture, thereby engaging the first trough stop with the coupling and securing the second trough in the coupling; and
  (f) moving the second fiber optic cable trough into the second trough aperture, thereby engaging the coupling latch with the second trough latch, and thereby securing the second trough in the coupling.

14. A process for the coupling a first fiber optic cable trough to a second fiber optic cable trough as recited in claim 13, and further wherein the retention clip is comprised of a retention clip body with a first body segment, a second body segment, a terminal end segment attaching the first body segment and the second body segment, the retention clip being conformed or conformable to and around the terminal end of the fiber trough, the first body segment including a latch corresponding and complementary to the trough aperture latch, and the retention clip further including a terminal end stop disposed to engage the terminal end of the trough it conforms to, thereby securing the retention clip on the terminal end of the trough.

15. A fiber trough retention clip for placement on a terminal end of a fiber optic cable trough to secure the trough within a trough aperture into which the terminal end of the trough slides, the trough aperture including a trough aperture latch, and the retention clip comprising: a retention clip body with a first body segment, a second body segment, a terminal end segment attaching the first body segment and the second body segment, the retention clip being conformed or conformable to and around the terminal end of the fiber trough, the first body segment including a latch corresponding and complementary to the trough aperture latch, and the retention clip further including a terminal end stop disposed to engage the terminal end of the trough it conforms to, thereby securing the retention clip on the terminal end of the trough.

16. A fiber trough retention clip as recited in claim 15, and wherein the trough aperture latch is a detent and the retention clip latch is a corresponding and complementary tab on the first body segment of the retention clip.

17. A fiber optic trough coupling for coupling a first trough to a second trough, the coupling comprising:
  (a) a trough inner wall section with a first end and a second end, the inner wall section forming the inner walls of a trough, the trough inner wall section including at least two inner wall section latches;
  (b) a coupling framework attached to the trough inner wall section, and disposed around it to form a first trough aperture at the first end of the coupling and a second trough aperture at the second end of the coupling, the coupling framework including at least two framework latches corresponding and complementary to the at least two inner wall section latches;
  (c) the first trough aperture being disposed to receive and complement the first trough stop to secure the first trough in the first trough aperture;

(d) the second trough aperture being disposed to receive and complement the second trough stop to secure the second trough in the first trough aperture; and wherein the trough inner wall section attaches to the coupling framework through the attachment of the at least two inner wall section latches to the at least two framework latches by moving the trough inner wall section together with the coupling framework.

18. A fiber optic trough coupling as recited in claim 17, and further wherein the at least two inner wall section latches are adapted to detach from the at least two coupling framework latches.

19. A fiber optic trough coupling as recited in claim 17, and further wherein the trough inner wall section attaches to the coupling framework solely through the attachment of the at least two inner wall section latches to the at least two framework latches by moving the trough inner wall section together with the coupling framework at least two inner wall section latches are adapted to detach from the at least two coupling framework latches.

* * * * *